US009881305B1

(12) United States Patent
Lewis et al.

(10) Patent No.: US 9,881,305 B1
(45) Date of Patent: Jan. 30, 2018

(54) CONTEXT-BASED RESTRICTIONS ON PAYMENT CARDS

(71) Applicant: Square, Inc., San Francisco, CA (US)

(72) Inventors: John Lewis, San Francisco, CA (US); Alexander W. Odawa, San Francisco, CA (US); Michael Stratton, Sunnyvale, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 14/271,379

(22) Filed: May 6, 2014

(51) Int. Cl.
*G06Q 20/40* (2012.01)
*G06Q 20/32* (2012.01)
*G06Q 20/20* (2012.01)
*G06F 17/22* (2006.01)

(52) U.S. Cl.
CPC ......... *G06Q 20/405* (2013.01); *G06Q 20/204* (2013.01); *G06Q 20/327* (2013.01)

(58) Field of Classification Search
CPC .... G06C 20/204; G06C 20/20; G06C 20/202; G06C 20/40; G06C 20/10
USPC .......................................................... 705/17
See application file for complete search history.

(56) References Cited

U.S. PATENT DOCUMENTS

| | | | |
|---|---|---|---|
| 7,707,089 B1 | 4/2010 | Barton et al. | |
| 7,752,135 B2 | 7/2010 | Brown et al. | |
| 8,499,355 B1 | 7/2013 | Goncharov | |
| 8,635,117 B1 | 1/2014 | Acuna-Rohter | |
| 8,990,121 B1 | 3/2015 | Guise et al. | |
| 2003/0112942 A1 | 6/2003 | Brown et al. | |
| 2007/0150387 A1* | 6/2007 | Seubert | G06Q 10/10 705/31 |
| 2008/0035725 A1 | 2/2008 | Jambunathan et al. | |
| 2008/0275760 A1 | 11/2008 | Easterly et al. | |
| 2009/0094126 A1* | 4/2009 | Killian | G06Q 20/0855 705/17 |
| 2010/0332400 A1 | 12/2010 | Etchegoyen | |

(Continued)

OTHER PUBLICATIONS

U.S. Appl. No. 14/271,350 of Lewis, J. et al. filed May 6, 2014.

(Continued)

*Primary Examiner* — Garcia Ade
(74) *Attorney, Agent, or Firm* — Maynard Cooper & Gale, P.C. (Square)

(57) ABSTRACT

Introduced here is a technology that enables effective fraud detection and protection in financial transactions by use of a communication signal capability associated with payment cards. The technology eliminates the uncertainty inherent in card transactions as to the authenticity of a payment card. In various embodiments, methods and systems are disclosed for placing context-based restrictions on the payment card to assist in eliminating the uncertainty in card transactions. The payment card can include any electronic card having an embedded smart chip (e.g., BLE, WiFi, GPRS, 4G, LTE, etc.). The context-based restrictions can include a geographical restriction, a timing restriction, a purchase amount restriction, a merchant-category-code restriction, a particular merchant restriction, or a proximity restriction. The context-based restrictions can be placed on the payment card through communication with a computing device (e.g., smartphone, computing tablet, laptop, desktop, etc.).

3 Claims, 9 Drawing Sheets

(56) References Cited

U.S. PATENT DOCUMENTS

| | | | |
|---|---|---|---|
| 2011/0153438 A1* | 6/2011 | Dragt | G06Q 20/20 705/17 |
| 2012/0030116 A1 | 2/2012 | Shirey et al. | |
| 2012/0084203 A1 | 4/2012 | Mehew et al. | |
| 2012/0330840 A1 | 12/2012 | Stinchcombe | |
| 2013/0189953 A1 | 7/2013 | Mathews | |
| 2013/0246187 A1 | 9/2013 | Chau et al. | |
| 2014/0172700 A1 | 6/2014 | Teuwen et al. | |
| 2014/0279518 A1 | 9/2014 | Acuna-Rohter | |
| 2015/0206416 A1 | 7/2015 | Marra et al. | |
| 2016/0110718 A1 | 4/2016 | Jajara et al. | |

OTHER PUBLICATIONS

U.S. Appl. No. 14/271,368 of Lewis, J. et al. filed May 6, 2014.

Restriction Requirement dated Mar. 26, 2015, for U.S. Appl. No. 14/271,368, of Lewis, J., et al., filed May 6, 2014.

Non-Final Office Action dated Sep. 11, 2015, for U.S. Appl. No. 14/271,368, of Lewis, J., et al., filed May 6, 2014.

Non-Final Office Action dated Jan. 20, 2016, for U.S. Appl. No. 14/271,368, of Lewis, J., et al., filed May 6, 2014.

Final Office Action dated Jul. 29, 2016, for U.S. Appl. No. 14/271,368, of Lewis, J., et al., filed May 6, 2014.

Non-Final Office Action dated Jul. 5, 2016, for U.S. Appl. No. 14/271,350, of Lewis, J., et al., filed May 6, 2014.

Notice of Allowance dated Jun. 26, 2017, for U.S. Appl. No. 15/087,581, of Quigley, O.S.C., et al., filed Mar. 31, 2016.

"Advancing Payment Security: MasterCard Contactless Security Overview," www.mastercard.com, retrieved from Internet URL: https://www.mastercard.com/contactless/doc/MasterCardContactless_SecurityFactSheet_2015.pdf, on Jun. 12, 2017, pp. 1-4.

Non-Final Office Action dated Jul. 8, 2016, in U.S. Appl. No. 15/087,581, of Quigley, O.S.C., et al., filed Mar. 31, 2016.

Non-Final Office Action dated Aug. 16, 2016, for U.S. Appl. No. 14/578,765, of Chi, Y., et al., filed Dec. 22, 2014.

Final Office Action dated Dec. 23, 2016, for U.S. Appl. No. 15/087,581, of Quigley, O.S.C., et al., filed Mar. 31, 2016.

Final Office Action dated Jan. 18, 2017, for U.S. Appl. No. 14/271,350, of Lewis, J., et al., filed May 6, 2014.

Advisory Action dated Mar. 3, 2017, for U.S. Appl. No. 15/087,581, of Quigley, O.S.C., et al., filed Mar. 31, 2016.

Final Office Action dated Mar. 9, 2017, for U.S. Appl. No. 14/578,765, of Chi, Y., et al., filed Dec. 22, 2014.

Notice of Allowance dated Oct. 13, 2016, for U.S. Appl. No. 14/271,368, of Lewis, J., et al., filed May 6, 2014.

Non-Final Office Action dated Oct. 4, 2017, for U.S. Appl. No. 14/578,765, of Chi, Y., et al., filed Dec. 22, 2014.

\* cited by examiner

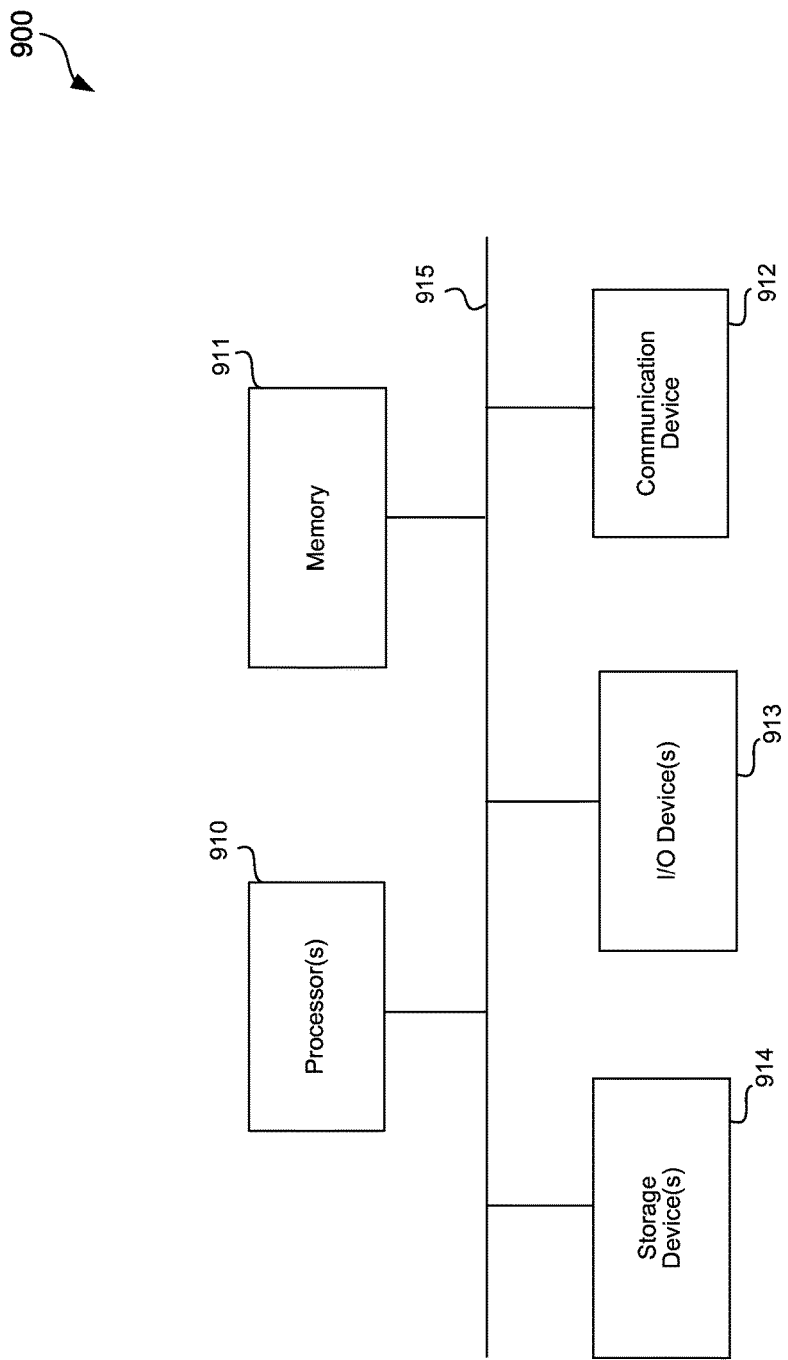

CONTEXT-BASED RESTRICTIONS ON PAYMENT CARDS

BACKGROUND

Financial transactions conducted by use of payment mechanisms (e.g., credit cards, debit cards, etc.) are prone to significant fraud. For example, an offender can acquire fraudulently the details on a magnetic stripe of a credit card from a cardholder to create one or more counterfeit cards. The offender can utilize the counterfeit cards to make a considerable amount of purchases before anyone discovers the fraud. Fraudulent activities often compromise confidential information and cause substantial financial damages for both the cardholder and the merchants involved. Additionally, fraudulent activities are costly to financial institution parties (e.g., banks, card issuers, etc.). Not only are the parties financially responsible for the damages, they also lose the confidence and trust of their consumers.

Various solutions are in place to address fraud, such as personal identification number ("PIN") or automated analysis of spending patterns. However, such solutions can lack reliability and/or real-time application, as the fraud may be discovered too late to prevent the damages done.

BRIEF DESCRIPTION OF THE DRAWINGS

FIG. 9 is a block diagram of an example computing system that can be used to implement features of various embodiments of the disclosed technology.

DETAILED DESCRIPTION

Figure 1:
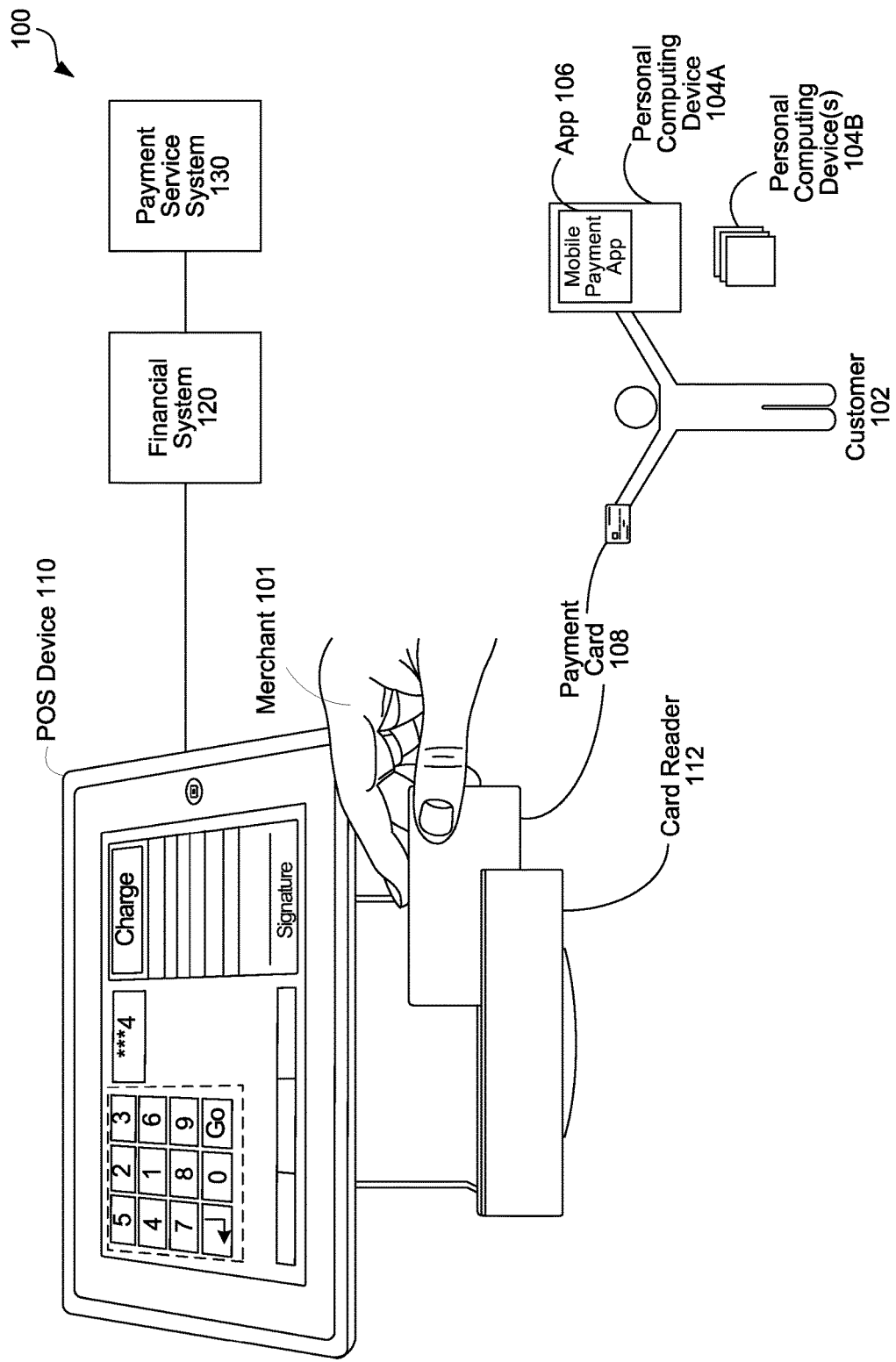
FIG. 1 illustrates an environment in which the disclosed technology can be implemented, in accordance with various embodiments.

References in this description to "an embodiment," "one embodiment," or the like, mean that the particular feature, function, structure or characteristic being described is included in at least one embodiment of the present invention. Occurrences of such phrases in this description do not necessarily all refer to the same embodiment. On the other hand, the embodiments referred to also are not necessarily mutually exclusive.

Introduced here is a technology that enables effective fraud detection and protection in financial transactions by use of a communication signal capability. The technology eliminates the uncertainty inherent in card transactions as to the authenticity of a payment card and/or of a customer (i.e., the customer is an authentic cardholder of the payment card). The technology is particularly advantageous when applied to an in-person transaction, where a customer is physically present to provide a payment card to a merchant at a point-of-sale (POS) terminal, or device, (e.g., a cash register). In particular, the technology can facilitate a communication with one or more personal computing devices physically carried on a body of the customer to establish the authentic presence of the customer at the POS terminal (i.e., "customer presence" or "cardholder presence") and/or of the payment card (i.e., "card presence"). The personal computing devices can include any device with any network communication capability, including a payment card in the form of an electronic card with embedded smart chip (e.g., BLE, Wi-Fi, GPRS, 4G, LTE, etc.). Further, the technology can facilitate placement of context-based restrictions on the usage of a payment card. The technology introduced here can be implemented by, for example, a mobile payment application running on a computing device (e.g., smartphone, tablet, etc.), a dedicated server for processing payment transactions, or a combination thereof.

According to the technology introduced here, the cardholder presence and/or the card presence can be established based on detection of a communication signal and/or a presence indication associated with a number of communication signals. In particular, a communication signal can be detected based on a broadcast of the communication signal by one or more personal computing devices of the cardholder present at the POS terminal. The communication signal(s) can be detected by the POS terminal, by a smartphone belonging to the cardholder, or a combination thereof.

In some instances where the communication signal is broadcast by an electronic card operating as a payment card, card presence can be established upon detection of such communication signal. In some instances where the communication signal (or signals) is broadcast by other computing devices, other than the payment card, the cardholder presence can be established upon determination of a strength of a combination of the communication signals (broadcast from the computing devices). The strength of the combination of the communication signals is referred to as a "presence indication" in this description. The presence indication can be determined as a function of a set of one or more parameters (i.e., a set of parameters). A determination of a strong presence indication is indicative of a low likelihood of fraud. Such determination can be used to determine an appropriate action to take with regards to the transaction. For example, the action can include sending of a fraud notification, generating a processing rate for the transaction, generating customized content for a receipt of the transaction, or generating a promotion for the transaction.

According to the technology introduced here, the context-based restrictions on the usage of the payment card can be implemented using communication between the payment card and a personal computing device. In some instances, the payment card can be any electronic card with embedded smart chip enabling the card to communicate with another device, such as a personal computing device, where the device allows a user (e.g., customer or a merchant) to communicate with the card and impose the context-based restrictions. In some instances, the payment card can be an ordinary payment card (e.g., magnetic stripe card) associated with a payment application executing on a computing device, where the payment application is used to make payment in a transaction.

In the following description, the example of a retailer is used, for illustrative purposes only, to explain various aspects of the technology. Note, however, that the technology introduced here is not limited in applicability to retailers or to any other particular kind of business. Additionally, the technology introduced here is not limited to use with payment cards or even to financial transactions. The technique can be employed with essentially any transaction that traditionally would be initiated by or involve the use of a physical card reader. Hence, the term "sale", as in point-of-sale (POS), refers to any type of payment-oriented transaction, including a lease or rental for example, and is not limited to an actual purchase. Note also that in this description, the term "user" generally refers to a customer (as opposed to a merchant), except where otherwise indicated, and except that the term "user interface" does not necessarily refer to an interface used by a customer, as will be apparent from the context.

Further, the term "customer" is used interchangeably throughout the description with "payer," "buyer," "consumer," and "cardholder," as opposed to merchant/payee/seller/retailer, without any intended change in meaning, unless otherwise specified. For example, in some instances, the term "customer" may be used to refer to an individual conducting a transaction with a merchant at the merchant's store, while the term "cardholder" is used to refer to the authentic owner of the payment card used in the transaction. In one example, the customer can be a child of the cardholder, who has given the child the payment card to pay for the transaction, where the cardholder may or may not be physically present at the store. In another example, the customer can be an individual committing fraud at the merchant's store using a stolen payment card of the cardholder.

In various embodiments, the technology introduced here can include various use cases involving the following sequence of actions, as described more fully below with respect to each use case. In each of the use cases, a customer visits a retailer and makes a purchase by presenting a payment mechanism for use at the merchant's POS device. The merchant's POS device reads information from the payment mechanism, for example, by having the customer swipe, tap, or insert the payment mechanism through a card reader of the POS device. The payment mechanism can be a magnetic stripe card, a re-programmable magnetic stripe card, a card or device containing a quick response (QR) code, a card or device containing a bar code, a biometrically identifiable object, a mobile device, or a smart card (e.g., contact smart card, contactless smart card, or hybrid smart card). The term "smart card" as used here refers generally to any electronic card with any embedded smart chip that provides the card a communication capability using any known network protocol (e.g., BLE, Wi-Fi, GPRS, 4G, LTE, etc.).

In a first use case, the POS device is a tablet computer (e.g., iPad®) that includes a mobile payment application running on the tablet computer. The mobile payment application can be in communication with a payment service server employed by a payment service to provide financial services associated with financial transactions, such as payment transactions, to the merchant (e.g., fraud protection).

The card reading action at the POS device (e.g., swipe, tap, or insertion) triggers a sequence of messages and other actions that are implemented by the mobile payment application working in conjunction with the payment service server. In particular, the mobile payment application takes a "snapshot" of all signals within close proximity of the POS device. The term "snapshot" as used here generally refers to a record, or blueprint, of signals detected by an application executing on a device in an environment within which the device is geographically located. In one example, the device is the merchant's POS device. In another example, the device is a cardholder's personal computing device (e.g., smartphone) that is located at or near the geographical location of the transaction instantiated on the POS device. The snapshot can include an identification of all devices located within the environment based on the signals broadcast by those devices (e.g., unique device IDs included in the signal information). The snapshot can be taken, for example, by the mobile payment application causing the POS device to scan its surrounding environment to detect one or more communication signals being broadcast by one or more personal computing devices within close proximity of the POS device. The POS device can utilize, for example, a Bluetooth Low Energy (BLE) communication component of the POS device.

The personal computing devices can include, for example, a FitBit® worn by the consumer, an iPhone® of the consumer, and/or an electronic card used as the payment card for the transaction conducted at the POS device. The communication signals received from these devices can include signal information, such as device identification information that provides a unique ID for each device. In the case where the device is an electronic payment card, the signal information can include payment account information associated with the payment card. The POS device sends the snapshot of signals (including the device identification information) to the payment service server for processing. In some embodiments, the mobile application executing on the POS device can process the snapshot of signals, as opposed to sending the snapshot to the payment service server.

The payment service server can utilize the snapshot of signals to determine the customer presence and/or the card presence by computing a presence indication. The payment service server can compute the presence indication by using a function of one or more parameters. The parameters can include a number of signals (i.e., total number of distinct signals detected), a signal strength (e.g., a level or magnitude of a particular signal), a type of signal (e.g., BLE, WiFi, etc.), and a source of the signal (e.g., signal detected from a wearable electronic device, a smartphone, a laptop, etc.), where a weight is assigned to each parameter. A summation of the parameters and associated weight can provide a numerical value for the presence indication (i.e., a magnitude of the presence indication).

In some embodiments, the snapshot of signals can be compared to a previous snapshot of signals associated with the payment card used in the transaction. In such embodiments, a previous set of parameters associated with a previous set of signals is compared to the current set of parameters for matches. A result of such comparison can be taken into consideration in the summation of the weighted parameters. In some embodiments, the comparison result can be a multiplication factor for any of the parameters. In some embodiments, the comparison result can be another parameter of the set of parameters. In one example, if the customer has previously visited the merchant using the same payment card, a previously taken snapshot for the previous transaction can be compared to determine whether the signals from the previous transaction and the present transaction match. A matching of two signals out of three total signals detected (e.g., based on unique IDs), for example, can indicate a high likelihood that the customer is the same customer in the previous transaction. In such example, a weighted parameter of 5 can be added to the summation of weighted parameters. The numerical value calculated from the summation can provide the level, or magnitude, of the presence indication, where the different levels can be used to establish customer presence and/or card presence. For example, customer presence is successfully established if a highest level (i.e., strongest presence indication), such as level "10," has been detected.

Card presence can be established if a communication signal identified to be that of the payment card is detected. It is noted, however, that a transaction may not be completely "fraud-free" based on a successful establishment of card presence alone. In one example, the customer uses a Bluetooth Low Energy (BLE) metacard (i.e., a type of smart card) as the payment mechanism to pay for the purchase. The POS device sends the transaction information, which includes the card number of the BLE metacard, to the payment service server. The payment service server identifies the card number to be associated with a BLE metacard and alerts the POS device, through the payment application, to detect for a signal of the BLE metacard. In particular, the signal would include device identification information that allows the server to determine whether the payment mechanism being used at the POS device is authentic. For example, a high likelihood of fraud exists if no BLE signal is detected at the POS device when a payment mechanism, carrying the card number associated with the BLE metacard, has been used. In such example, the payment mechanism is likely a counterfeit card.

In a second use case of the example, the POS device is a traditional POS device (e.g., a typical cash register with no payment application in communication with the payment service server). In such case, the card swiping action (or taping, insertion, etc.) at the POS device triggers a sequence of messages and other actions that are implemented by the payment service server working in conjunction with a mobile payment application. The mobile payment application can be executing, or running, on a mobile device belonging to the cardholder (as opposed to the merchant). It is noted, the cardholder may or may not be the customer in the transaction. For example, the customer is an individual who has borrowed (or stolen) the payment card of the cardholder. In another example, the customer is the cardholder himself/herself conducting the transaction with the merchant at the POS device.

In the second use case, the POS device, in response to the swipe, sends transaction information to a traditional financial system for processing. The financial system forwards the transaction information to the payment service server. In some instances, the financial system is working in coordination with the payment service server to transmit the transaction information at all times. For example, the financial system utilizes fraud protection service offered by the payment service. In other instances, the financial system transmits the transaction information only in circumstances where data, extracted from the transaction information, indicates that the cardholder of the payment card is associated with the payment service. For example, the cardholder has a user account with the payment service.

The payment service server, responsive to receiving the transaction information, sends a request to a mobile device of the customer to establish customer presence and/or card presence. In sending such request, the payment service server is operating under the presumption that the customer is carrying the mobile device on the customer's body, and such mobile device is located geographically at or near the POS device. The payment service server can analyze the transaction information, identify the card number utilized in the transaction, and identify the mobile device of the customer based on card number. The payment service server sends the request through a mobile payment application running on the mobile device to cause the mobile device to take a "snapshot" of all signals within close proximity of the mobile device. An instance of fraud may be detected if the mobile device is not geographically located at or near the POS device. That is, for example, the payment card (with the identified card number) has been stolen.

The mobile device, in response to the request received at the payment application running on the device, detects, within the environment surrounding the mobile device, for any communication signals broadcast by any computing devices. Similar to the POS device discussed in the first use case, the mobile device in this second use case can detect one or more communication signals, broadcast by any smart card and/or one or more devices belonging to the customer, to determine card presence and/or customer presence. The mobile device sends the snapshot to the payment service server for processing. In some embodiments, the mobile device can determine the card presence and/or customer presence using the mobile payment application running on the mobile device, as opposed to sending the snapshot to the payment service server.

In some embodiments, the mobile device can also send GPS coordinates recorded by the mobile device to the payment service server for use in the presence indication determination. The GPS coordinates can be compared with GPS coordinates extracted from the transaction information to help the payment service server determine whether the mobile device (and the customer, by extension) is geographically located at or near the POS device.

In a third use case, both the POS device and the customer's mobile device include a payment application running on one or more processors of each respective device. In such use case, the payment service server sends a request to the POS device and the mobile device, respectively, to take a snapshot of signals for establishing customer presence and/or card presence. The mobile device and the POS device can work independently to detect communication signals of one or more devices surrounding each respective device.

Similar to the first and second use cases discussed above, the mobile device and/or the POS device can detect communication signals broadcasted by a smart card and/or one or more electronic devices, other than the smart card, belonging to the customer. Detection of a communication signal that is broadcast by the smart card can be used to establish card presence. Detection of signals broadcast by the other devices can be used to establish customer presence. The POS device (and the mobile device) sends the snapshot of the detected signals to the payment service server. The payment service server can use the information received from both the POS device and the mobile device to determine the likelihood of fraud associated with the transaction. For example, a strong presence indication determined with information from the POS device can counteract a weak presence indication determined with information from the mobile device. On the other hand, a strong presence indication determined with information from both of the devices provide a very low likelihood of fraud. The determination of the likelihood of fraud can be used to perform various actions. The actions can include, for example, sending the customer a digital receipt with content customized for that customer, sending the customer a promotion customized for that customer, or determining a processing rate for processing the transaction with the customer. The payment service server can perform these various actions with a "peace of mind" with the establishment of the card presence and/or the customer presence.

In any of the three use cases, the payment service server can cause a fraud alert to be sent in response to a weak presence indication indicating a lack of card presence and/or customer presence. For example, in the first use case, the payment application can display a notification (e.g., pop-up message) on the POS device to alert the merchant. In the second use case, for example, the notification can be sent to the customer's smartphone to alert the customer. In the third use case, the notification can be sent to both the POS device and the smartphone. In any of the use cases, the notification can include a prompt for the merchant and/or customer to approve (or deny) the transaction in light of the potential fraudulent activity. The customer may approve the transaction, for example, if the customer is aware that his daughter is borrowing the payment mechanism to make the purchase. The customer may deny, for example, if he has lost his payment mechanism.

Additionally, in any of the three use cases, context-based restrictions may be applied on the usage of the payment mechanism. The context-based restriction can provide another level of protection against financial risks associated with the financial transaction between the merchant and the customer. For example, the payment mechanism can be an electronic card, such as a smart card programmed to activate or deactivate the payment operation of the card based on the context-based restrictions.

FIG. 1 illustrates an environment 100 in which the disclosed technology can be implemented, in accordance with various embodiments. The environment 100 includes a merchant point-of-sale (POS) device 110 of a merchant 101, a financial system 120, and a computer server system 130 employed by a financial service for facilitating services associated with financial transactions, such as authorizing a charge to a credit card for a payment transaction. The computer server system 130 (hereinafter, "payment service system") can be, or a part of, the payment service server discussed above.

The POS device 110 can include a card reader 112 configured to read information from a payment card 108 of a customer 102 in order initiate one or more payment transactions between the customer 102 and the merchant 101. The card reader 112 can be a card reader with a slot through which a payment card can be swiped, a card reader with a slot for insertion of the payment card, or a card reader with a receiver that receives a communication signal transmitted from an electronic card (e.g., proximity card, contactless smart card, etc.). The POS device 110 can be coupled to the payment service system 130 through a network (not shown), which can be, or include, the Internet and one or more wired networks or wireless networks (e.g., a WiFi network and/or a cellular telecommunications network). The POS device 110 and the payment service system 130 can be coupled to the financial system 120 also through the network.

In various embodiments, the environment 100 includes personal computing devices 104 of the customer 102 (also referred to as "consumer," "buyer", "payer," or "cardholder"). As used here, the term "personal computing device" generally refers to any electronic devices carried by the customer 102 (e.g., carried in purse, bag, pockets, etc.). The personal computing devices 104 (hereinafter, "devices 104") can include, for example, one or more mobile devices 104A (e.g., smartphone, tablet computer, laptop computer, or any other form of mobile processing device), one or more wearable electronic devices 104B (e.g., FitBit®, Pebble®, headset, etc.), or any other form of processing devices embedded with communication capabilities, such as Bluetooth® Low Energy ("BLE"), Bluetooth® 4.0, WiFi®, GPRS, 4G, LTE, etc. For instance, the devices 104 can include an electronic card operating as the payment card 108 (i.e., electronic payment card), where the electronic card is any smart card embedded with a BLE chip or any other type of smart chips (e.g., Wi-Fi, 4G, LTE, etc.). The smart card can be a contact smart card, a contactless smart card, or a hybrid smart card. The term "smart card" as used here generally refers to any electronic card with embedded integrated circuits, where the circuits can include a communication circuit In one example, the payment card 108 can be a BLE metacard, which is a smart card with a BLE chip that provides communication capability using BLE protocol. The term "BLE" as used here generally refers to a feature of Bluetooth® wireless technology directed to low power applications for wireless devices. BLE may be used to link automatically two wireless devices, such as a wearable electronic device 104B to another wireless communicating device, such as a mobile device 104A (e.g., iPhone® 5), within a short range of one another. Today, an increasing number of consumer electronic devices are equipped with BLE capability (hereinafter "BLE devices"). As such, the payment card can be a BLE device. The customer 102 can utilize the BLE metacard to tender payment to the merchant at the POS device 110. Further, other devices 104 carried on the body of the customer can be BLE devices.

The devices 104 can be coupled to the POS device 110 and/or the payment service system 130 over the network discussed above. In some embodiments, the devices 104 can communicate to other devices within its surrounding through a network connection using any communication protocol known to one of ordinary skill in the art. For example, a wearable electronic device 104B broadcasts a communication signal, such as a BLE signal, that can be received, or detected, by the POS device 110 or the mobile device 104A. In another example, a BLE metacard, in the form of the payment card 108, broadcasts a BLE signal that can be received, or detected, by the POS device 110 or the mobile device 104A.

In some embodiments, a mobile payment application 106 runs on the mobile device 104A. In some embodiments, the mobile payment application 106 runs on the POS device 110. The mobile payment application 106 can receive instructions from the payment service system 130 to perform various functions associated with the payment transaction conducted at the POS device 110. For example, the mobile payment application 106 can assist the payment service system 130 to establish a customer presence or a card presence, as will be discussed in more details below. In some embodiments, the mobile payment application 106 can be a part of an operating system of the device on which the application 106 executes. In some embodiments, the mobile payment application 106 can be an application downloaded over a network and installed on the device.

The environment 100 can accommodate both traditional payment transactions (i.e., those involving traditional payment mechanisms such as plastic credit or debit cards with magnetic stripes), as well as the transactions utilizing electronic payment mechanisms (e.g., a card having a BLE chip or any other types of smart chip). In a traditional credit card transaction, for example, the merchant 101 swipes the customer's credit card 108 through the card reader 112 at the POS device 110. The POS device 110 sends transaction data read from the card to a computer system of the merchant's acquirer. The transaction data can include, for example, product price, sales tax amount, merchant identification (e.g., name of merchant, merchant category code (MCC), place of business address, etc.), cardholder identification (e.g., name of cardholder, card number, expiration date, card verification value (CVV), billing zip code, phone number, or social security number), and the like. The acquirer sends the data to a computer system of a card payment network (e.g., Visa or MasterCard), which forwards the data to a computer system of an issuing bank that authorizes the payment for the transaction. For purposes of discussion, the acquirer, the card payment network, and the issuing bank can be, or is a part of, a financial system 120 illustrated in FIG. 1

A payment service operates the payment service system 130 to work in conjunction with the financial system 120. In particular, the payment service system 130 performs various services associated with the financial transactions, alongside the financial system 120, to enhance the merchant's business. In various embodiments, the payment service system 130 can assist the merchant 101 by facilitating communication with the payment mechanism 108 to regulate usage of the payment card based on various restriction policies. Further details of such embodiments will be discussed in at least FIG. 5.

In various embodiments, the payment service system 130 can assist the merchant 101 by verifying the authenticity of the financial transactions. In particular, the payment service system 130 facilitates communication with the devices 104 to determine (a) a presence of the customer 102 (i.e., customer presence) at the POS device 110 and/or (b) a presence of the payment mechanism 108 (e.g., payment card) at the POS device 110. The customer presence can be a physical presence (i.e., physically located at or near the POS device's geographical location) or a virtual presence (i.e., present by acknowledgement and/or approval by the customer). The virtual presence can be established by the customer acknowledging her presence electronically, for example, by approving a transaction conducted on her behalf (e.g., her employee using her payment card 108). Further details of these embodiments will be discussed in at least FIGS. 2-4.

It is noted that each of the POS device 110, the financial system 120, and the payment service system 130 can include one or more distinct physical computers and/or other processing devices that can be connected to each other through one or more wired and/or wireless networks.

Figure 2:
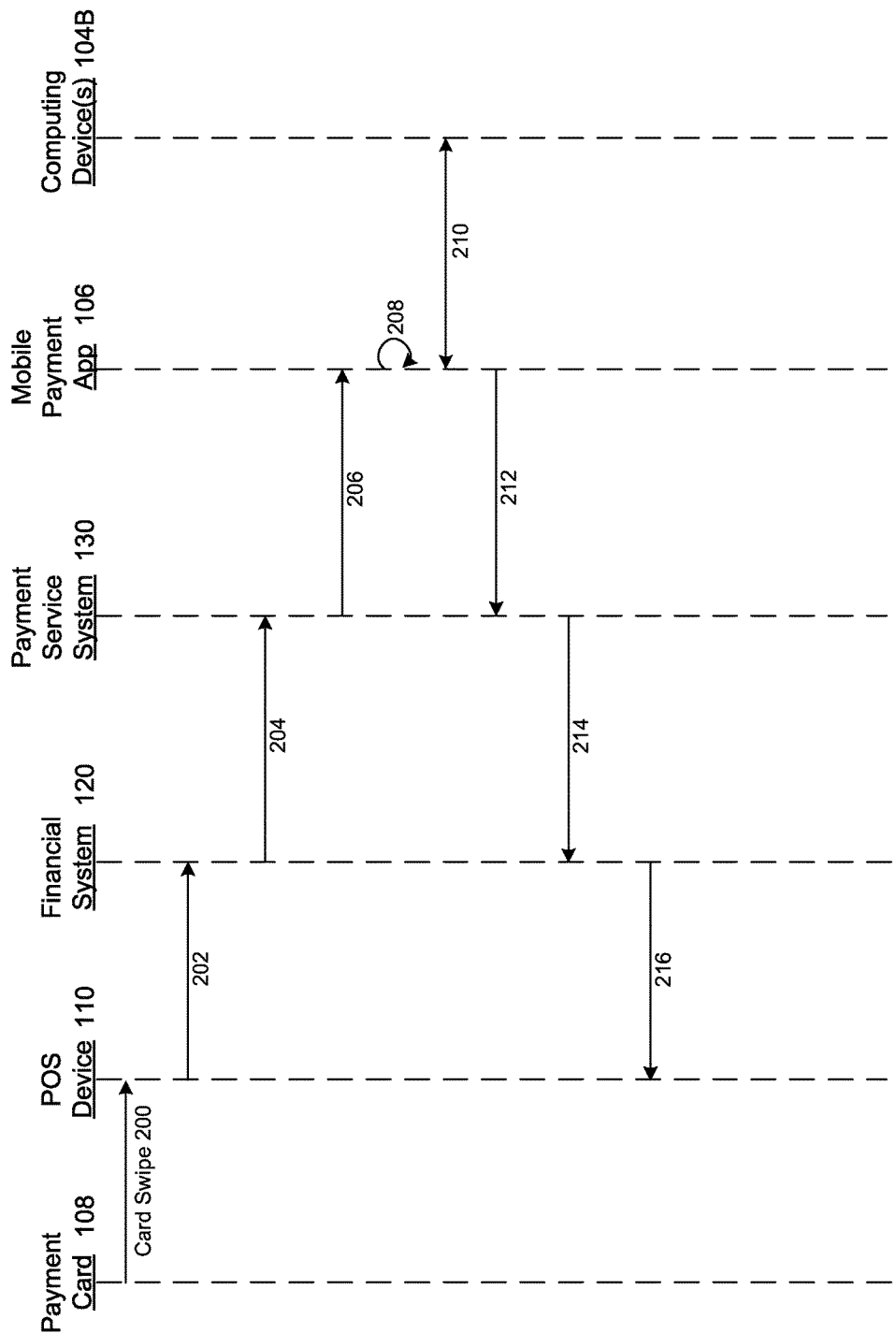
FIG. 2 is a sequence diagram illustrating a process for determining a card presence and/or customer presence associated with a payment transaction, in accordance with a first embodiment of the technology.

FIG. 2 is a sequence diagram illustrating a process for determining a card presence and/or a customer presence associated with a payment transaction, in accordance with a first embodiment. The process can be performed by the components in the environment 100 of FIG. 1 in accordance with the embodiment. A card presence is established upon detection of a communication signal of the card (i.e., a signal identifying the card). In some embodiments, the card presence is established upon a determination of a presence indication associated with the communication signal that identifies the card. A customer presence is established upon a determination of a presence indication associated with a combined strength of one or more communication signals associated with devices that belong to the customer (i.e., a presence indication). In some embodiments, the presence indication includes the communication signal of the payment card, in addition to the signals of other personal computing devices. In such embodiments, a strong presence indication exists, for example, when both the card presence (i.e., detection of the card's communication signal) and the customer presence (i.e., detection of the other devices' signals) are established. In some embodiments, the presence indication includes only the communication signals of the other personal computing devices, not including the payment card. A strong presence indication represents a high likelihood that the transaction is an authentic transaction (i.e., low likelihood of fraud). As will be discussed in further detail below in accordance with various embodiments, certain actions can be performed based on the card presence and/or customer presence, such as to generate dynamically a processing rate for a payment transaction, a promotion for the transaction, or a receipt for the transaction. For example, establishment of customer presence based on a high presence indication causes generation of a low processing rate for the transaction.

In some embodiments, the presence indication can be determined using a policy that defines a numerical value for the presence indication as a function of one or more parameters associated with the communication signals of the devices detected near or at the POS device. The parameters can include a "number parameter" (i.e., a number of signals detected within a physical environment surrounding the POS device 110, a "strength parameter" (i.e., a signal strength), "type parameter" (i.e., a type of signal detected, such as BLE, WiFi, etc.), and "signal source parameter" (i.e., a source of each signal detected, such as a wearable electronic device, a smartphone, etc.). The numerical value can correspond to a hierarchical scale from weak to strong. The policy can be configured by a merchant user (e.g., merchant 101) of the payment service system 130 or an operator of the payment service system 130 (e.g., an employee of the payment service).

In some embodiments, the policy can define the function as a summation of the one or more parameters with weights associated with the parameters. In such embodiments, a weight can be assigned to each parameter based on the content of that parameter. For example, a BLE metacard signal source has a higher associated weight than a FitBit signal source, where the two sources are in the same parameter category. In such example, the signal from the BLE metacard can be specified to have two times the weight of the signal from the FitBit. In another example, a WiFi type of signal has less weight than a BLE type of signal, as a WiFi signal can be detected within a broad range of distances, providing less reliability for the determination of the indication of presence. A summation of the parameters and associated weights can provide a numerical value for the presence indication.

In some embodiments, the policy can define the function as a summation of the one or more parameters with weights multiplied by the parameters. In such embodiments, the presence indication can be expressed as: $P(x,y,z)=a*x+b*y+c*z$, where x, y, and z are the different parameters, and where a, b, and c are the weights. A weight can be assigned to each parameter based on the particular category of the parameter. For example, a number parameter (e.g., 10 signals) can be assigned less weight than a signal source parameter (e.g., BLE metacard). A summation of the parameters and weights multiplied by those parameters can provide a numerical value for the presence indication.

In some embodiments, a result of a comparison between snapshots of signals can be, or a part of, the summation of the weighted parameters. As discussed above, a snapshot refers to a record, or blueprint, of signals detected by an application (executing on a device) in an environment within which the device is geographically located. A current snapshot of signals, taken in a current transaction, can be compared with one or more previous snapshots associated with a payment card used in a transaction. Based on the comparison, any corresponding information between the snapshots can be identified (e.g., matching parameters such as signals and/or unique device IDs associated with the signals). For example, two previous snapshots can provide information that a particular cardholder of a payment card carried three devices on the cardholder's body at the previous two payment transactions when the payment card was used. When a new transaction takes place with the same payment card, a current snapshot taken at the new transaction can be compared with the previous two transactions to determine whether the cardholder is present at the new transaction (i.e., Does the current snapshot include information indicative of signals of the three devices?). The payment service system 130 can store snapshots associated with the payment card and/or the cardholder and perform the comparison at new each transaction. The payment service system 130 can learn about the payment card and/or the customer and build a profile of the customer based on the snapshots.

In some embodiments, the result of a snapshot comparison can be used as a multiplication factor for any of the parameters in the presence indication determination. For example, detection of a BLE signal from a FitBit, which matches the BLE signal from a previous snapshot, can provide a multiplication factor (e.g., x2) for each value of the type parameter and the signal source parameter. In some embodiments, the result of the snapshot comparison can be used as another parameter of the set of parameters in the presence indication determination. The comparison result can operate as a fourth parameter ("snapshot parameter") in the set of parameters and be included in the summation to determine the presence indication. Similar to the other parameters, the snapshot parameter can have associated weight and/or a weight multiplied by the parameter. For example, a current snapshot having signals that match all the signals in a previous snapshot can provide a parameter value of "5," and has an increased weighted value if the current snapshot further matches with three other previous snapshots associated with the same payment card.

Referring to the process of FIG. 2, a traditional POS device of a merchant, such as a traditional cash register, is utilized in the process. The process begins at step 200 when a payment card 108 is swiped at the POS device 110, for example, through the card reader 112. According to the embodiment of FIG. 2, the payment card 108 is a traditional credit or debit card typically used at a tradition cash register. The POS device 110 reads the transaction information from the payment card 108 and, at step 202, sends the information to the financial system 120. The transaction information can be sent to any one of the acquirer computer system, the card payment network computer system, and/or the issuing bank computer system of the financial system 120.

According to the embodiment, the payment service system 130 is in communication with one or more of the computer systems of the financial system 120. In one example, the payment service system 130, employed by the payment service, provides identification information associated with one or more customers of the payment service to the card payment network computer system as a part of a business agreement between the payment service and the card payment network (e.g., Visa®) to facilitate fraud protection service for the one or more customers. In another example, the payment service is in a business agreement with the acquirer. In yet another example, the payment service is in a business agreement with the issuing bank. The identification information provided by the payment service system 130 can include information that identifies the one or more customers, for example, by name, by card number (e.g., the account numbers of any payment cards associated with or owned by a particular customer), by address, or by any other identification information that can be read from a payment card. The identification information can be stored, for example, in a database of a corresponding computer system (e.g., of the acquirer, the card payment network, or the issuing bank).

In any of the examples above, upon detection of a customer of the payment service system, the corresponding computer system (of the financial system 120) forwards the transaction information from the payment card 108 to the payment service system 130, as indicated by step 204. The detection can be based on, for example, a matching card number identified in the transaction information based on the identification information stored by the corresponding computer system. The payment service system 130 analyzes the transaction information to determine whether the customer has registered a personal computing device with the payment service. For example, the customer has downloaded to her mobile device the mobile payment application 106 provided by the payment service via the payment service system 130.

At step 206, the payment service system 130 communicates with the mobile device via the mobile payment application 106. For example, the payment service system 130 sends a push notification to the mobile payment application 106. In particular, the payment service system 130 requests the mobile payment application 106 to detect any communication signal(s) broadcast from one or more devices within the environment surrounding the mobile device on which the application 106 is running (e.g., device 104A). In some embodiments, the payment service system 130 requests the mobile payment application 106 to send back GPS coordinates recorded by the mobile device 104A. Such requests by the payment service system 130 are sent under the assumption that, because the mobile device belongs to the customer (i.e., the owner identified for the payment card 108), the mobile device is geographically located within proximity of the POS device 110 (i.e., where the transaction is taking place).

At step 208, the mobile payment application 106 retrieves the GPS coordinates stored by the mobile device. The mobile payment application 106 can retrieve signal information by causing the mobile device to detect communication signals within proximity of the mobile device, as indicated by step 210. In some embodiments, this can be executed by utilizing BLE communication of the mobile device to find, connect, and/or detect any broadcasting of BLE signals by the BLE beacons of one or more BLE devices within proximity of the mobile device. The BLE signal can include a unique device identifier of the device from which the signal is transmitted. For example, the mobile device communicates and receives three BLE signals that can be identified, based on their respective BLE identifiers, to be transmitted from a FitBit®, a Pebble®, and an iPad®. These three devices can belong, for example, to the customer associated with the payment card 108. In other embodiments, step 210 can be executed by utilizing any communication capabilities of the mobile device to detect any broadcasting of other types of communication signals transmitted from the one or more devices.

At step 212, the mobile payment application 106 transmits the requested information (i.e., communication signal information) to the payment service system 130. In some embodiments, the payment service system 130 utilizes the communication information from the mobile payment application 106 to determine a presence indication associated with the communication signals detected. As discussed above, the presence indication is determined based on a policy of the payment service system 130. The policy can define the presence indication as a function of a set of parameters. The predetermined threshold can correlate to the presence indication value determined using the function of the set of parameters.

The presence indication assists the payment service system 130 in determining a customer presence and/or a card presence associated with the transaction. A strong presence indication can establish customer presence (i.e., a high likelihood that the actual cardholder, or customer, is present at the transaction location where the POS device 110 is located) and/or the card presence (i.e., a high likelihood that the authentic card is present at the transaction location). It is noted that according to the embodiment of FIG. 2, where a traditional payment card 108 is utilized for the transaction, only the customer presence can be determined. In the embodiment of FIG. 2, the payment service system 130 can determine whether an instance of fraud is occurring based on whether customer presence can be established using the presence indication.

In some embodiments, the payment service system 130 stores one or more previous detections of communication signals associated with the customer. The payment service system 130 can perform a comparison of the signals detected in the current transaction with those signals detected in previous transactions to determine the presence indication. For example, in the last two transactions conducted by the customer (with the same merchant or another merchant), three signals associated with three personal computing devices have been detected. In comparison to only one signal detected in the current transaction, the payment service system 130 determines the presence indication to be "weak." Further, as the one signal has not been detected before in the last two transactions, the payment service system 130 determines that the presence indication is "very weak" (i.e., likely not the same customer using the payment card 108). That is, customer presence cannot be established based on the presence indication. As a result, the payment service system 130 may generate a fraud notification based on the "very weak" presence indication determined.

In some embodiments, the payment service system 130 determines the presence indication for establishing customer presence based on the GPS coordinates received from the mobile payment application running on the mobile device (i.e., step 208). The payment service system 130 can analyze the GPS coordinates to determine a current geographical location of the mobile device ("device location"). The payment service system 130 can also analyze the transaction information received from the financial system 120 (e.g., from acquirer, card payment network, and/or issuing bank) to determine a geographical location of the POS device 110 where the transaction occurs ("transaction location"). The payment service system 130 compares the device location with the transaction location to determine the presence indication. That is, the customer presence can be established if the mobile device of the customer is currently located near, or at the same, geographical location of the POS device 110. On the other hand, where the device location does not match the transaction location, a weak presence indication is determined (i.e., cardholder presence cannot be established). In some embodiments, the payment service system 130 combines the geographical signal information (e.g., GPS coordinates) with the device signal information (e.g., BLE signals) to determine the presence indication for establishing the customer presence. In some embodiments, the geographical signal information can be a parameter (i.e., "GPS parameter") or a part of the set of parameters in determining the presence indication.

At step 214, the payment service system 130 transmits the results of the presence indication determination to the financial system 120. In some embodiments, the payment service system 130 generates and transmits a fraud notification to the financial system 120. The financial system 120, for example, may mark the transaction with a "fraud alert signal" for further review. In some embodiments, the financial system 120 forwards the fraud notification to the POS device 110 to alert the merchant, as indicated in step 216. The fraud notification can simply be a notification message. The fraud notification can also be a prompt to the merchant to take an action, such as to check the ID of the individual who has presented the payment card, or to approve the transaction to continue processing (e.g., merchant submits an input to the POS device to communicate the approval to the financial system 120).

Figure 3:
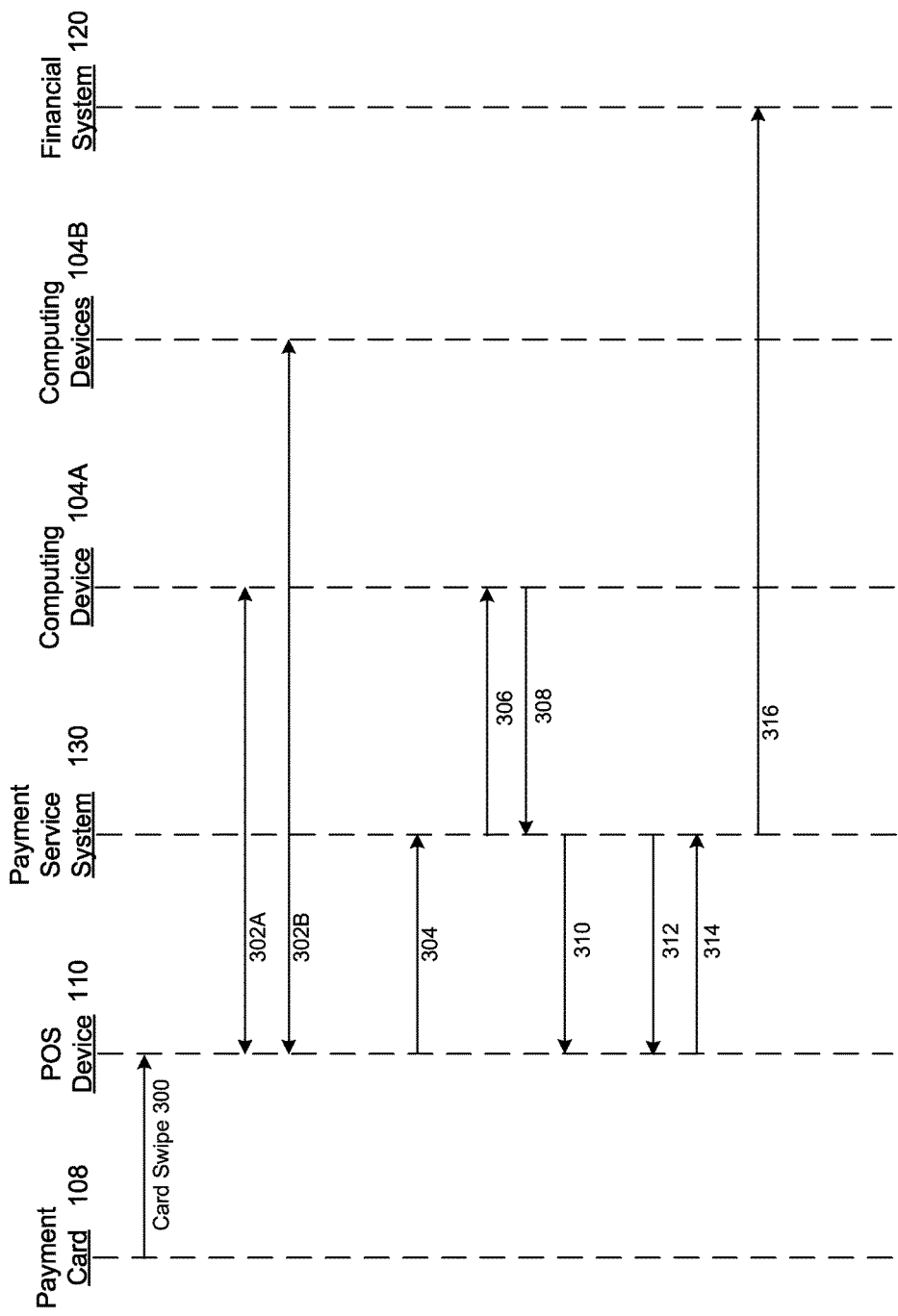
FIG. 3 is a sequence diagram illustrating a process for determining a card presence and/or customer presence associated with a payment transaction, in accordance with a second embodiment of the technology.

FIG. 3 is a sequence diagram illustrating a process for determining a card presence and/or customer presence associated with a payment transaction, in accordance with a second embodiment. The process can be performed by the components in the environment 100 of FIG. 1 in accordance with the embodiment. In the embodiment of FIG. 3, the process occurs using a merchant's POS device that has a mobile payment application 106 running on a processor of the POS device, such as the mobile payment application 106 facilitated by the payment service system 130. The process begins at step 300 when a payment card 108 is swiped at the POS device 110, for example, through the card reader 112. In some embodiments, the payment card 108 is a traditional credit or debit card. In some embodiments, the payment card 108 is an electronic payment card having an embedded BLE chip or any other smart chip (e.g., GPS, Wi-Fi, GPRS, 4G, LTE, etc.) enabling the card to communicate with remote devices.

The POS device 110 reads the transaction information from the payment card 108 from the swipe 300, and analyzes the information using the mobile payment application 106 running on the POS device 110. In particular, the mobile payment application 106, with instructions received from the payment service system 130, causes the processor of the POS device 110 to execute a detection of one or more communication signals transmitted from one or more computing devices within proximity of the POS device 110 (i.e., steps 302A, 302B). For example, the processor employs a communication device of the POS device to communicate and receive signals from the one or more computing devices. The one or more devices can include the personal computing devices 104 of the customer, including, for example, a mobile device 104A and two wearable electronic devices 104B. In some embodiments, the POS device 110 sends the transaction information to the payment service system 130 for analysis. The payment service system 130, in turn, sends a request to the POS device 110 via the mobile payment application 106 to detect the communication signals.

In some embodiments, the mobile device 104A can have the mobile payment application 106 (i.e., a second mobile payment application 106) running on the device 104A to enable communication with the payment service system 130. In some embodiments, the mobile device 104A is simply a mobile device without any communication with the payment service system 130. The wearable electronic devices 104B can include a Pebble® and a FitBit®. By communicating and detecting the signals transmitted from the mobile device 104A and the wearable electronic devices 104B, the POS device 110, through the mobile application 106, can determine a presence indication associated with the transaction for establishing customer presence. In some embodiments, the computing devices 104 detected within proximity of the POS device can include the payment card 108, such as a BLE metacard operating as the customer's payment card 108 used in the transaction of FIG. 3. In such embodiments, the POS device 110 detects a BLE signal identifying the BLE metacard. The POS device 110 can analyze the information extracted from the BLE signal (e.g., unique BLE device ID) to perform a comparison with the account information associated with the payment card 108. For example, the transaction information received from the card swipe 300 indicates that the payment card 108 has a card number associated with a particular unique BLE device ID. The POS device 110, through the mobile payment application 106, compares the particular unique BLE device ID with the BLE device ID extracted from the BLE signal to identify a match. A matching BLE device ID can result in a strong presence indication, where such match establishes card presence. That is, the payment card 108 is an authentic card, as opposed to a counterfeit card replicating the transaction information (e.g., card number, cardholder name, etc.).

In some embodiments, the POS device 110 sends the presence indication determination to the payment service system 130, as indicated in step 304. In some embodiments, the POS device 110 sends the communication signal information to the payment service system 130 for determination of the presence indication (i.e., presence indication is determined by the payment service system 130, as opposed to the mobile payment application 106 running on the POS device 110). In embodiments where the mobile payment application 106 determines the presence indication, the presence indication determination is sent to the payment service system 130 for further processing, such as fraud notification and/or further communication with the financial system 120 (i.e., step 314).

When the presence indication does not satisfy a predetermined threshold (i.e., not an adequately strong signal), a fraud notification is generated. The threshold can be predetermined according to the policy of the payment server system 130. As discussed above, the policy can define the presence indication as a function of a set of parameters. The predetermined threshold can correlate to the presence indication value determined using the function of the set of parameters.

In some embodiments, it is the mobile payment application 106 that generates the fraud notification in the event that the presence indication does not satisfy the predetermined threshold. In such embodiments, the mobile payment application 106 communicates the fraud notification to the payment server system 130, which forwards the fraud notification to the mobile device 104A of the customer, as indicated in step 306. In some embodiments, it is the payment server system 130 that generates the fraud notification, and forwards the fraud notification to the mobile device 104A, as indicated in step 306.

In some embodiments, the payment server system 130 utilizes the fraud notification to prompt the customer for approval of the transaction. Upon receiving an input from the customer (e.g., decline or approve transaction), as indicated in step 308, the payment service system 130 forwards the input to the POS device 110 through the mobile payment application 106, as indicated in step 310. For example, the payment service system 130 sends a push notification to the mobile payment application 106 to alert the merchant that the customer has declined the transaction. The merchant, in turn, can decline service to the individual who has presented the (likely counterfeit) payment card 108.

In some embodiments, the payment server system 130 transmits the fraud notification to the POS device 110 to prompt the merchant for approval of the transaction, as indicated in step 312. As discussed above, the fraud notification may be generated by the mobile payment application 106 running on the POS device 110, and step 312 does not occur in such embodiments. At step 314, the POS device 100, e.g., through the mobile payment application 106, transmits an input from the merchant (e.g., decline or approve transaction) to the payment service system 130. In such scenario, the merchant can turn refuse (or provide) service to the individual who has presented the payment card 108. In some embodiments, the payment service system 130 may simply mark the transaction for further review. At step 316, the payment service system 130 transmits the transaction information to the financial system 120 for further processing. In some embodiments, the payment service system 130 transmits additional information associated with the presence indication determined for the transaction. For example, the payment service system 130 transmits an indication that the transaction should be marked for review.

Figure 4:
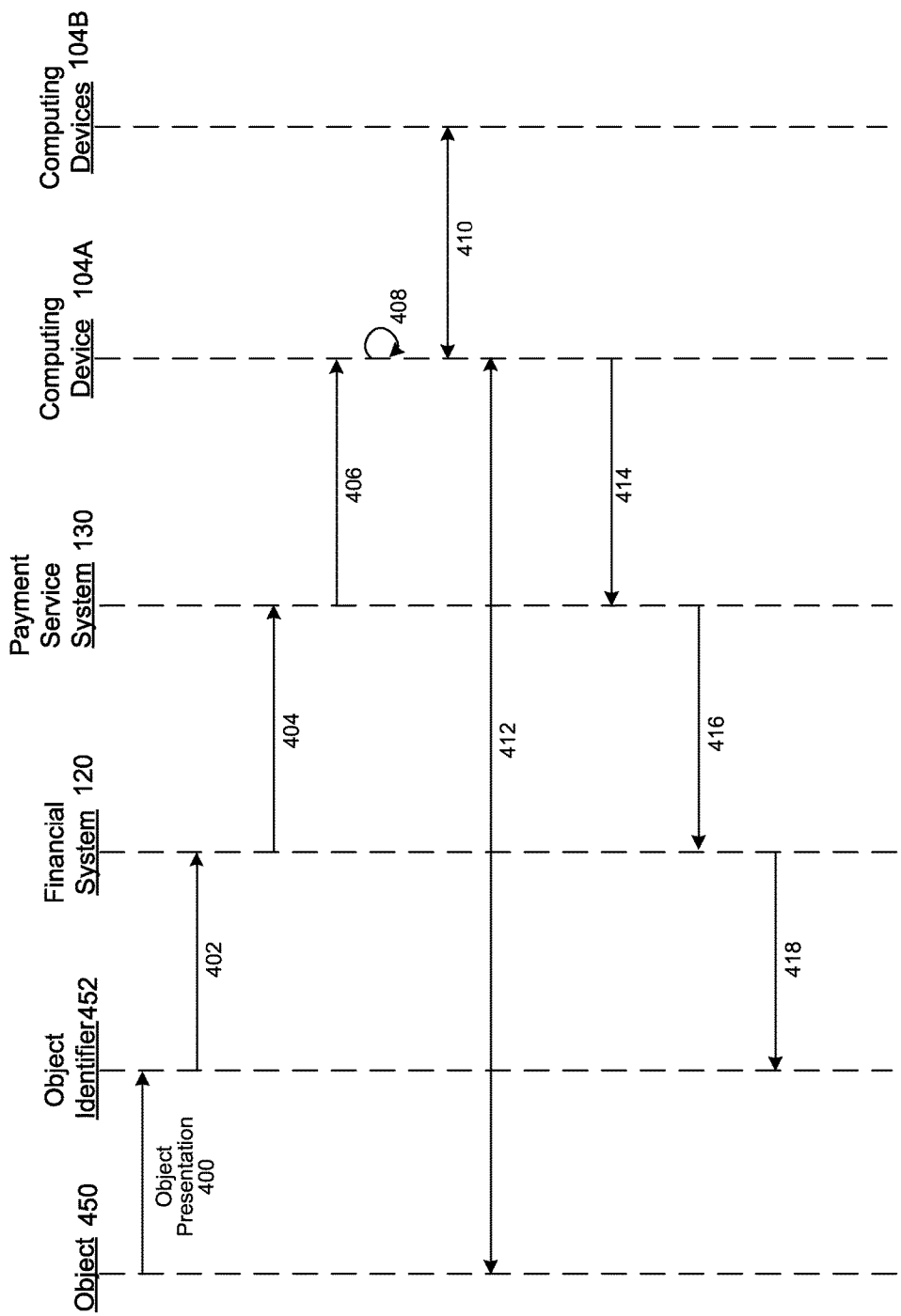
FIG. 4 is a sequence diagram illustrating a process for determining a card presence and/or customer presence associated with a payment transaction, in accordance with a third embodiment of the technology.

FIG. 4 is a sequence diagram illustrating a process for determining a card presence and/or customer presence associated with a payment transaction, in accordance with a third embodiment. The process can be performed by the components in the environment 100 of FIG. 1 in accordance with the embodiment. In the embodiment of FIG. 4, the process occurs using a merchant's POS device 110 that has an object identifier 452 configured to identify and read information stored on the payment object 450. The payment object 450 can be, for example, an electronic card with a smart chip that enables the payment object 450 to communicate with other devices (e.g., the computing device 104A). The process begins at step 400 when the payment object 450 is presented to the object identifier 452 of the POS device 110.

In some embodiments, the POS device 110 sends the transaction information directly to the payment processing system 130 for processing. In some embodiments, the POS device 110 reads the transaction information, via the object identifier 452, from the object 450, and sends the information to the financial system 120, as indicated in step 402. The information can be sent to any one of the acquirer computer system, the card payment network computer system, and/or the issuing bank computer system. In such embodiments, the payment service system 130 is in communication with one or more of the computer systems of the financial system 120 (e.g., acquirer, card payment network, and/or issuing bank), as discussed above with regards to FIG. 2. In some embodiments, the payment service system 130 provides identification information to any one of the acquirer computer system, the card payment network computer system, and/or the issuing bank computer system for facilitating reduction of financial risks associated with fraudulent activities. The identification information can include information that identifies the one or more customers of the payment service, for example, by name, by card number (e.g., the account numbers of any payment cards associated with or owned by a particular customer), by address, or by any other identification information that can be read from a payment card. The identification information can be stored, for example, in a database of a corresponding computer system (e.g., of the acquirer, the card payment network, or the issuing bank).

Upon detection of a customer of the payment service system by any of the corresponding computer system (of the financial system 120), the transaction information is forwarded to the payment service system 130, as indicated by step 404. The detection can be based on, for example, a matching card number identified in the transaction information based on the identification information stored by the corresponding computer system. The payment service system 130 analyzes the transaction information to determine whether the customer has registered a personal computing device with the payment service. For example, the customer has downloaded to her mobile device, such as device 104A, the mobile payment application 106 provided by the payment service via the payment service system 130.

At step 406, the payment service system 130 communicates with the mobile device 104A via the mobile payment application 106. For example, the payment service system 130 sends a push notification to the mobile payment application 106. In particular, the payment service system 130 requests the mobile payment application 106 to detect any communication signal(s) broadcast from one or more devices within the environment surrounding the mobile device on which the application 106 is running (e.g., device 104A). In some embodiments, the payment service system 130 requests the mobile payment application 106 to send back GPS coordinates recorded by the mobile device 104A. Such requests by the payment service system 130 are sent under the assumption that because the mobile device belongs to the customer (i.e., the owner identified for the payment card 108), the mobile device 104A should be physically within proximity of the POS device 110 (i.e., where the transaction is taking place).

At step 408, the mobile payment application 106 retrieves the GPS coordinates stored by the mobile device 104A. Further, the mobile payment application 106 can retrieve signal information by causing the mobile device 104A to detect communication signals within proximity of the mobile device, as indicated by step 410. In some embodiments, this can be executed by utilizing BLE communication of the mobile device 104A to find, connect, and/or detect any broadcasting of BLE signals by the BLE beacons of one or more BLE devices within proximity of the mobile device. The BLE signal can include a unique device identifier of the device from which the signal is transmitted. For example, the mobile device communicates and receives three BLE signals that can be identified, based on their respective BLE identifiers, to be transmitted from a FitBit®, a Pebble®, and an iPad®. These three devices can belong, for example, to the customer associated with the object 450, and can be the computing devices 104B. In other embodiments, step 410 can be executed by utilizing any communication capabilities of the mobile device to detect any broadcasting of other types of communication signals transmitted from the one or more devices.

The mobile payment application 106 can also retrieve signal information by causing the mobile device 104A to find, connect, and/or detect a communication signal of the object 450 located within proximity of the mobile device, as indicated by step 412. Detection of such signal can help establish a presence indication indicative of card presence. For example, the transaction information received from the card swipe 400 can provide information such as a card number and a particular device ID associated with the object 450. The mobile payment application 106 can compare the particular unique device ID with a device ID extracted from the communication signal received from the object 450 to identify a match. A matching device ID can result in a strong presence indication, where such match establishes card presence. That is, the object 450 is an authentic object utilized as a payment card in the transaction, as opposed to a counterfeit card. In some embodiments, the determination of the presence indication indicative of card presence can be performed by the payment service system 130 after step 414 is performed (i.e., signal information including the device ID is transmitted).

At step 414, the mobile payment application 106 transmits the requested information (i.e., communication signal information) to the payment service system 130. In some embodiments, the payment service system 130 utilizes the communication information from the mobile payment application 106 to determine a presence indication associated with the communication signals detected. As discussed above, the presence indication is determined based on a policy of the payment service system 130. The policy can define the presence indication as a function of a set of parameters. The predetermined threshold can correlate to the presence indication value determined using the function of the set of parameters. In some embodiments, the policy can define the presence indication as a combined presence indication that includes a first presence indication indicative of customer presence (e.g., using summation of weighted parameters) and a second presence indication indicative of card presence.

In some embodiments, the payment service system 130 stores one or more previous detections of communication signals associated with the customer. The payment service system 130 can perform a comparison of the signals detected in the current transaction with those signals detected in previous transactions to determine the presence indication for establishing customer presence. For example, in the last two transactions conducted by the customer (with the same merchant or another merchant), three signals associated with three personal computing devices have been detected. In comparison to only one signal detected in the current transaction, the payment service system 130 determines the presence indication to be "weak." Further, as the one signal has not been detected before in the last two transactions, the payment service system 130 determines that the presence indication is "very weak" (i.e., likely not the same customer using the payment card 108). That is, customer presence cannot be established based on the presence indication.

At step 416, the payment service system 130 transmits the results of the presence indication determination to the financial system 120. In some embodiments, the payment service system 130 generates and transmits a fraud notification to the financial system 120. The financial system 120, for example, may mark the transaction with a "fraud alert signal" for further review. In some embodiments, the financial system 120 forwards the fraud notification to the POS device 110 to alert the merchant, as indicated in step 418. The fraud notification can simply be a notification message. The fraud notification can also be a prompt to the merchant to take an action, such as to check the ID of the individual who has presented the payment card, or to approve the transaction to continue processing (e.g., merchant submits an input to the POS device to communicate the approval to the financial system 120).

Figure 5:
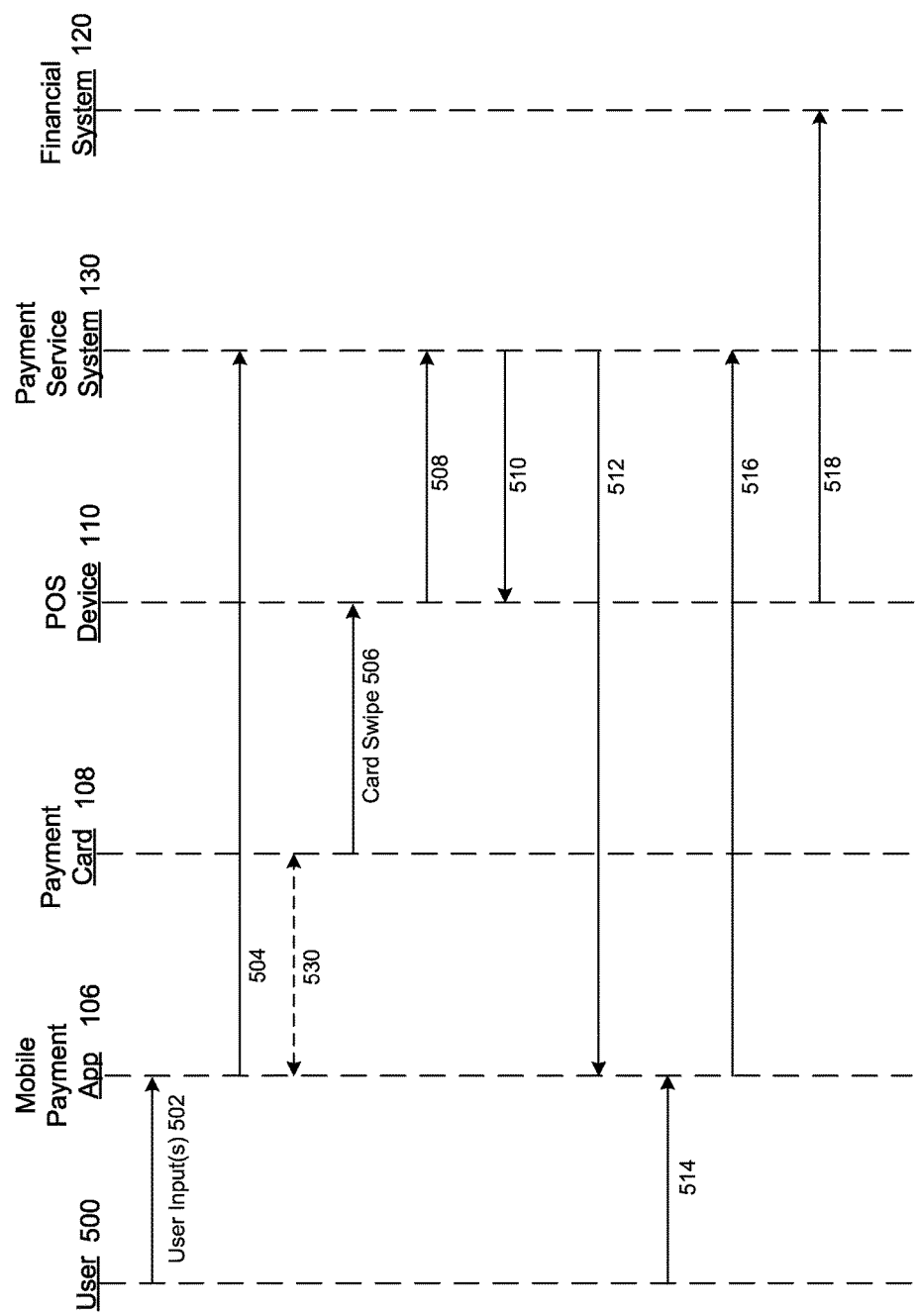
FIG. 5 is a sequence diagram illustrating a process for implementing context-based usage restrictions on a payment card, in accordance with an embodiment.

FIG. 5 is a sequence diagram illustrating a process for implementing context-based usage restrictions on a payment card, in accordance with an embodiment of the technology. The process can be performed by the components in the environment 100 of FIG. 1. The process occurs using a payment card in the form of a first mobile payment application ("App X"). The mobile payment application can be configured by the payment service system 130 to operate as an electronic wallet that maintains one or more account numbers associated with one or more payment cards of a customer. The mobile payment application can be the mobile payment application 106 facilitated by the payment service system 130.

The payment card utilized in the form of App X can be the payment card 108. According to one embodiment, the payment card 108 can be a traditional credit or debit card with a magnetic stripe for storing payment information, customer identification information, etc. For example, the mobile payment application maintains a VISA issued card for the customer to utilize in payment transactions, where the card number has been added to the mobile payment application and associated with the customer's user account with the payment service system 130. In some embodiments, the POS device utilized with the App X can be a POS device having a second mobile payment application ("App Y") configured to communicate and read payment information transmitted from the App X utilized as the payment card.

The process begins at step 502 when a user 500, such as a cardholder, submits one or more inputs via the App X to place context-based restrictions on usage of the payment card 108. Note that while only one payment card is discussed in this example, the App X can be utilized to maintain several payment cards. For example, the user 500 may, at step 502, choose to place time restriction on a first payment card and a purchase amount restriction on a second payment card, where the first and second payment cards are both maintained by the App X. Note also that the individual who is the cardholder in this process can be different from the individual who is the customer conducting a transaction using the payment card.

The context-based restrictions, submitted by the user 500, can include restrictions based on timing (e.g., use only during business hours), merchant type (e.g., MCC code), specific merchant (e.g., Bernicio Café), purchase amount (i.e., purchase limit), and a geographical location. Context-based restrictions can be beneficial for an owner of a payment card to limit use when the owner allows another individual (e.g., employee, child, etc.) to use the payment card. The context-based restrictions can also be beneficial to prevent, or at least reduce, fraudulent activities. For example, a geographical restriction can be placed to deactivate the card if it is utilized outside of a particular area defined by the user 500 (e.g., stolen). At step 504, the App X sends the context-based restrictions submitted by the user 500 to the payment service system 130, which causes the restrictions to be applied to the payment card. In particular, the payment service system 130 can use the restrictions to facilitate usage of the payment card specified by the user 500 via the App X.

At step 506, the payment card 108 is swiped at the POS device 110, for example, through the card reader 112. The POS device 100 has App 2 running on a processor of the POS device, such as the mobile payment application 106 facilitated by the payment service system 130, to communicate and read information from the payment card 108 via App X. At step 508, the POS device 110, recognizing the payment card 108 is a payment card associated with the payment service system 130, sends the transaction information, which includes the information read from the payment card 108, to the payment service system 130 for processing.

At step 510, the payment service system 130 causes the restrictions to be applied to the payment card, according to the user inputs submitted at step 502. For example, from the transaction information, the payment service system 130 acknowledges that the transaction is within a context where the payment card is used at a merchant with an MCC code that does not match with the MCC code specified in the restrictions. In such example, the payment service system 130 transmits to the POS device 110 a message to deny, or decline, the transaction. In another example, the restrictions placed on the payment card 108 includes a total purchase amount limit of $500 for a period of time from 9 AM-5 PM. In such example, when the transaction information indicates that the payment card has already made $500 worth of purchase, and the transaction is initiated at 4 PM, the payment service system 130 transmits a message to decline the transaction. The payment service system 130 can transmit the message to decline the transaction also if the transaction is taking place at 5:01 PM, regardless of whether the purchase limit has been reached.

The payment service system 130 can notify the user 500 of any suspicious activity. For example, the user 500 can place a restriction to notify the user 500 if the payment card is used in a geographical context outside of a zip code. In response to detecting such geographical context, the payment service system 130 can send a notification to the user 500 via the App X (e.g., push notification), as indicated in step 512. At step 514, the user 500 can deny or approve the transaction using the App X in response to the notification. At step 516, the App X sends the user's denial or approval to the payment service system 130. In some embodiments, the user's denial or approval can be sent directly to the POS device 110. At step 518, the payment service system 130 forwards the transaction information and any addition information (e.g., mark transaction for potential fraud) to the financial system 120 for processing of the payment.

In some embodiments, the process can occur using a payment card in the form of a BLE metacard or any other electronic card with a smart chip enabling the card to communicate with remote devices (i.e., "smart card"). The smart chip can be a GPRS chip, a Wi-Fi chip, a 4G chip, an LTE chip, etc. In such embodiments, the user 500 can utilize the App X to communicate directly with the payment card, as indicated by step 530. The App X can communicate the context-based restrictions directly to the payment card. For example, the user 500 can utilize the App X to communicate with the BLE metacard to determine whether the card is within a proximity of the device on which the App X is executing in order to detect a "stolen card" condition. In such example, the restrictions can cause the BLE metacard to deactivate whenever the BLE metacard does not have contact with, or receive communication from, the App X executing on the mobile device (i.e., not within proximity of the mobile device which is presumably on the body of the cardholder). Such proximity determination is another embodiment of the geographical restriction discussed above.

In another example, the payment card is a Europay, Mastercard, and Visa (EMV) smart card. The App X can communicate with the EMV card at every two hours to determine whether the card is within proximity of the mobile device on which the App X is executing in order to detect a "stolen card" condition. In such example, the user 500 can utilize the App X to program the EMV card to self-deactivate when the EMV card does not have contact with, or receive communication from, the App X at the end of the second hour. In some embodiments, the process can occur using a hardware proxy card. In some embodiments, the process can occur using a software proxy card. In these various embodiments, similar to the EMV card and the BLE metacard, the user 500 can utilize the App X to communicate with the payment card and place context-based restrictions on usage of the card.

Figure 6:
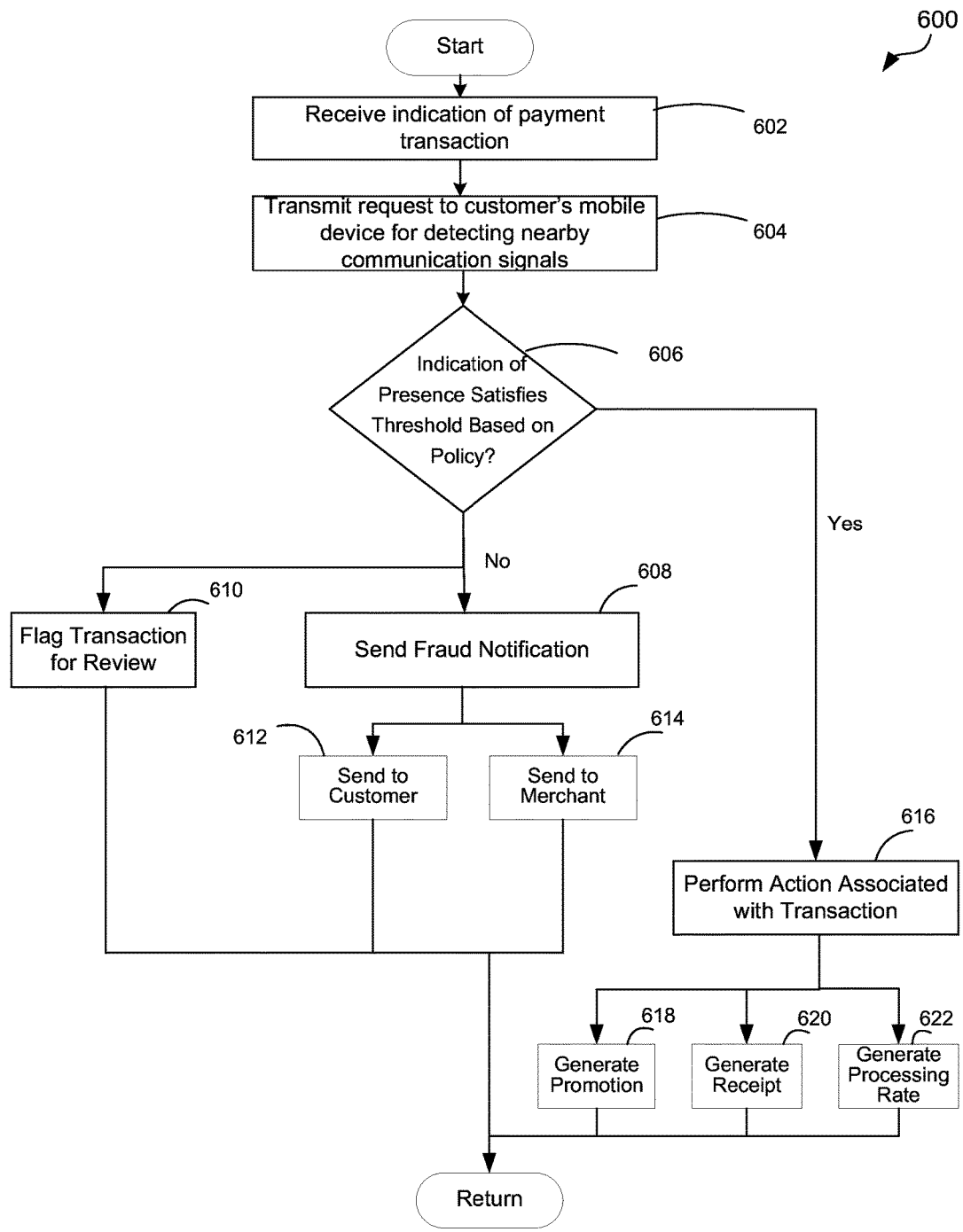
FIG. 6 is a flow diagram illustrating a process for determining a card presence and/or a customer presence, performed by a payment service system.

FIG. 6 is a flow diagram illustrating a process 600 for determining a card presence and/or customer presence associated with a payment transaction, performed by a payment service system, in accordance with an embodiment. The process 600 can be performed by the payment service system 130 in the environment 100 of FIG. 1. At step 602, the payment service system 130 receives an indication of a payment transaction. The indication can be sent from a POS device, a financial system 120, and/or a combination thereof. At step 604, the payment service system 130 transmits a request to a mobile device of the customer, where the mobile device includes a mobile payment application configured to cause the mobile device to detect any communication signal(s) transmitted from one or more devices within proximity of the mobile device.

At step 606, the payment service system 130 receives the communication signal information requested from the mobile device and implements a policy using that information. In particular, the payment service system 130 utilizes the communication signal information to determine a presence indication that includes a first presence indication indicative of customer presence and a second presence indication indicative of card presence. Customer presence can be determined based on a number of signals detected from personal devices of the customer located within the proximity of the mobile device. Card presence can be determined based on a signal detected from an electronic card utilized as the payment card in the transaction.

The policy defines a relative strength of the presence indication needed to establish the customer presence and/or the card presence. That is, the policy defines a predetermined threshold that the presence indication must meet. As discussed above, the policy can define the presence indication as a function of a set of parameters. The predetermined threshold can correlate to the presence indication value determined using the function of the set of parameters. A fraud occurrence is determined if the presence indication falls below the predetermined threshold.

If the payment service system 130 determines that the presence indication does not satisfy the threshold according to the policy, the process 600 proceeds to step 608 and/or step 610. At step 608, the payment service system 130 generates a fraud notification. The payment service system 130 can transmit the fraud notification to the customer, e.g., at the customer's mobile device, as indicated in step 612. The payment service system 130 can transmit the fraud notification to the merchant, e.g., at the merchant's POS device, as indicated in step 614. If the payment service system 130 determines that the presence indication does not indicate a high likelihood of fraud, but a possibility of fraud does exist, the payment service system 130 can flag the transaction for review, as indicated in step 610. The process 600 returns if the payment service system 130 determines that the presence indication does satisfy the threshold according to the policy.

In some embodiments, the process 600 continues to step 616 if the payment service system 130 determines that the presence indication does satisfy the threshold according to the policy. At step 616, the payment service system 130 can perform various actions based on the indication of presence, or presence indication, i.e., based on the level of trust established in regards to the transaction. In some embodiments, the payment service system 130 can dynamically generate a promotion for sending to a customer of a financial transaction (e.g., payment transaction), as indicated in step 618. The customer can receive the promotion at a computing device of the customer (e.g., smartphone, laptop, wearable electronic, etc.) through any application running on the computing device (e.g., email application, web browser application, text messaging application, downloaded application from Apple® Store, etc.). The payment service system 130 can generate the promotion for a particular transaction upon determination of the presence indication associated with the transaction. A strong presence indication provides a high level of confidence for the transaction (e.g., the customer is authentic holder of the payment card), and as such, the payment service system 130 can deliver a promotion that includes, for example, personal information about the customer. In one example, the payment service system 130 generates an invitation to an exclusive event upon a determination of a strong presence indication. In another example, the payment service system 130 generates a "$5 Off" coupon for a particular product purchased by the customer in the transaction, where the presence indication is sufficient to indicate the customer is authorized to use the payment card (e.g., presence indication of "5" on a scale of 1 to 10).

In some embodiments, the payment service system 130 can dynamically generate a receipt based on the presence indication, as indicated in step 620. The customer can receive the receipt at a computing device of the customer (e.g., smartphone, laptop, wearable electronic, etc.) through any application running on the computing device (e.g., email application, web browser application, text messaging application, downloaded application from Apple® Store, etc.). The payment service system 130 can generate the receipt to include various customized content based on the presence indication associated with the transaction. In one example, the payment service system 130 generates a receipt with a loyalty rewards program included in the receipt upon a determination of a strong presence indication. That is, the payment service system 130 enrolls the customer in a loyalty rewards program to keep track of purchases and reward the customer for those purchases because of the trust established based on the strong presence indication. In another example, the payment service system 130 generates a receipt with merely the transaction information included (e.g., items purchased, prices, date, etc.) where the presence indication is sufficient to indicate the customer is authorized to use the payment card (e.g., presence indication of "5" on a scale of 1 to 10).

In some embodiments, the payment service system 130 can dynamically generate a processing rate associated with the transaction ("transaction rate") based on the presence indication determined for that transaction, as indicated in step 622. The term "transaction rate," as used here, refers to a rate that a payment service can charge merchants for processing a particular financial transaction (e.g., payment transaction) on behalf of the merchant. Using the presence indication, the payment service system 130 can determine whether a particular transaction is "safe" (i.e., low likelihood of fraud) and determine a corresponding transaction rate. For example, for a payment transaction in which the determined presence indication is "10" (e.g., on a scale of 1 to 10), the payment service system 130 can generate a transaction rate of 1.5% for the transaction, as such transaction has a low likelihood of fraud. That is, the strong presence indication provides a high level of confidence for the transaction, and as such, the payment service can provide the low processing rate.

Figure 7:
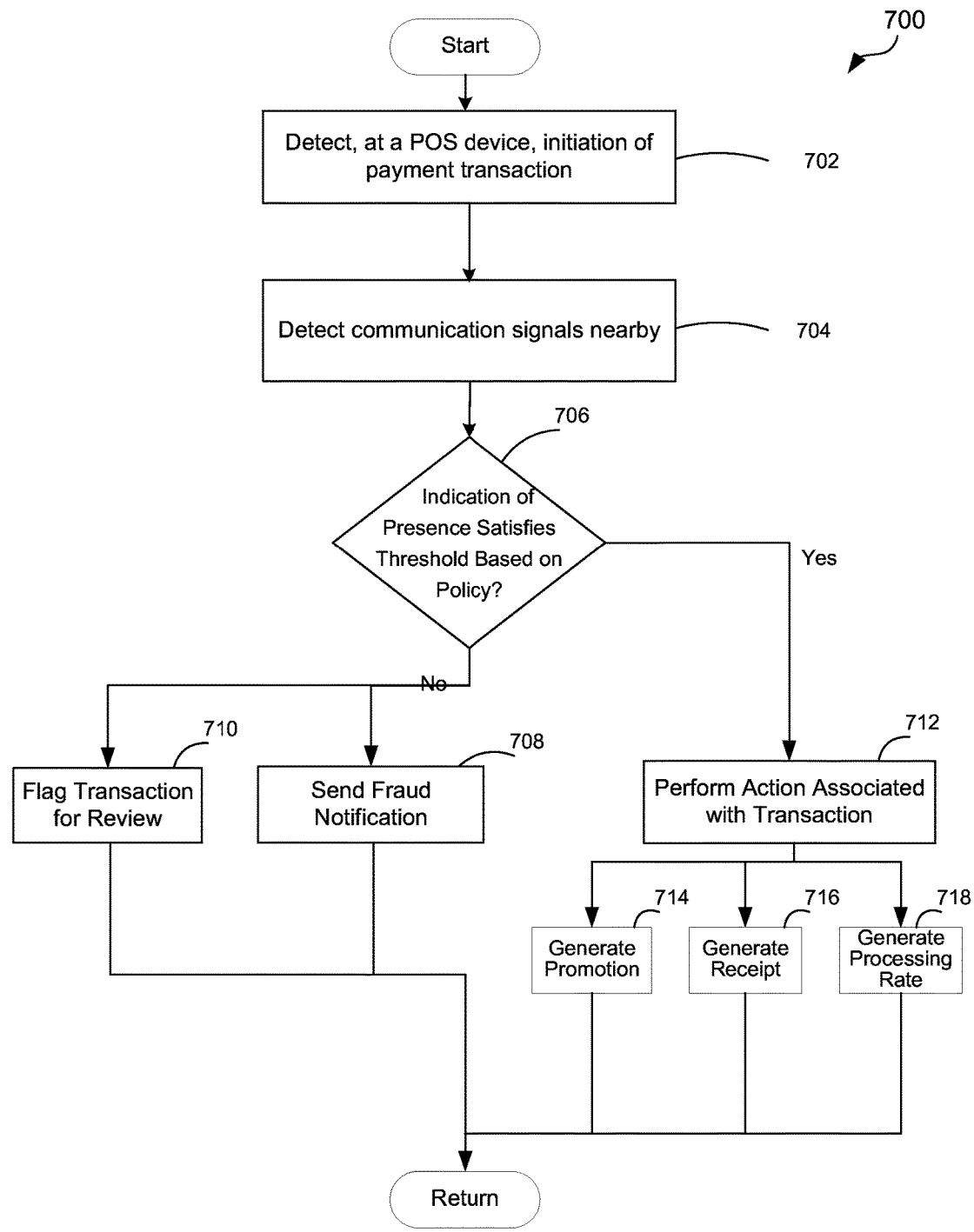
FIG. 7 is a flow diagram illustrating a process for a card presence and/or customer presence associated with a payment transaction, performed by a mobile payment application running on a POS device.

FIG. 7 is a flow diagram illustrating a process 700 for determining a card presence and/or customer presence associated with a payment transaction, performed by a mobile payment application running on a POS device, in accordance with an embodiment. The process 700 can be performed by the mobile payment application 106 in communication with the payment service system 130 in the environment 100 of FIG. 1. At step 702, the payment service system 130 receives an initiation of a payment transaction. The payment transaction can be initiated by a use of a payment card at the POS device, e.g., a swipe through a card reader. At step 704, the mobile payment application 106 causes the POS device to detect any communication signal (s) transmitted from one or more devices within proximity of the POS device. At step 706, the mobile payment application 106 utilizes the communication signal information associated with the communication signals detected to determine a presence indication. The presence indication can be determined to include a first presence indication indicative of customer presence and a second presence indication indicative of card presence. Customer presence can be determined based on a number of signals detected from personal devices of the customer located within the proximity of the mobile device. Card presence can be determined based on a signal detected from an electronic card utilized as the payment card in the transaction.

At step 706, the mobile payment application 106 determines whether the presence indication satisfies the predetermined threshold according to the policy set out by the payment service system 130. The policy defines a relative strength of the presence indication needed to establish the customer presence and/or the card presence. That is, the policy defines a predetermined threshold that the presence indication must meet. As discussed above, the policy can define the presence indication as a function of a set of parameters. The predetermined threshold can correlate to the presence indication value determined using the function of the set of parameters. A fraud occurrence is determined if the presence indication falls below the predetermined threshold.

If the mobile payment application 106 determines that the presence indication does not satisfy the threshold according to the policy, the process 700 proceeds to step 708. At step 708, the mobile payment application 106 causes a fraud notification to be generated. The fraud generation can be, for example, a pop-up notification displayed on the POS device. In some embodiments, the mobile payment application 106 can transmit an indication of fraud, along with the presence indication information, to the payment service system 130. The payment service system 130 can generate and transmit a fraud notification to the customer (e.g., via an email accessible by a web browser running an iPad, a desktop computer, a laptop computer, etc.). If the mobile payment application 106 determines that the presence indication does not indicate a high likelihood of fraud, but a possibility of fraud does exist, the mobile payment application 106 can flag the transaction for review, as indicated in step 710. The process 700 returns if the mobile payment application 106 determines that the presence indication does satisfy the threshold according to the policy.

In some embodiments, the process 700 continues to step 712 if the payment service system 130 determines that the presence indication does satisfy the threshold according to the policy. At step 712, the payment service system 130 can further perform various actions based on the indication of presence, or presence indication, i.e., based on the level of trust established in regards to the transaction. These various actions can be similar to the actions discussed in FIG. 6 with respect to step 716. In some embodiments, the payment service system 130 can dynamically generate a promotion for sending to a customer of a financial transaction (e.g., payment transaction), as indicated in step 714. In some embodiments, the payment service system 130 can dynamically generate a receipt based on the presence indication, as indicated in step 716. In some embodiments, the payment service system 130 can dynamically generate a processing rate associated with the transaction ("transaction rate") based on the strength signal determined for that transaction, as indicated in step 718. The process 800 returns upon performance of the various actions of steps 714-718.

Figure 8:
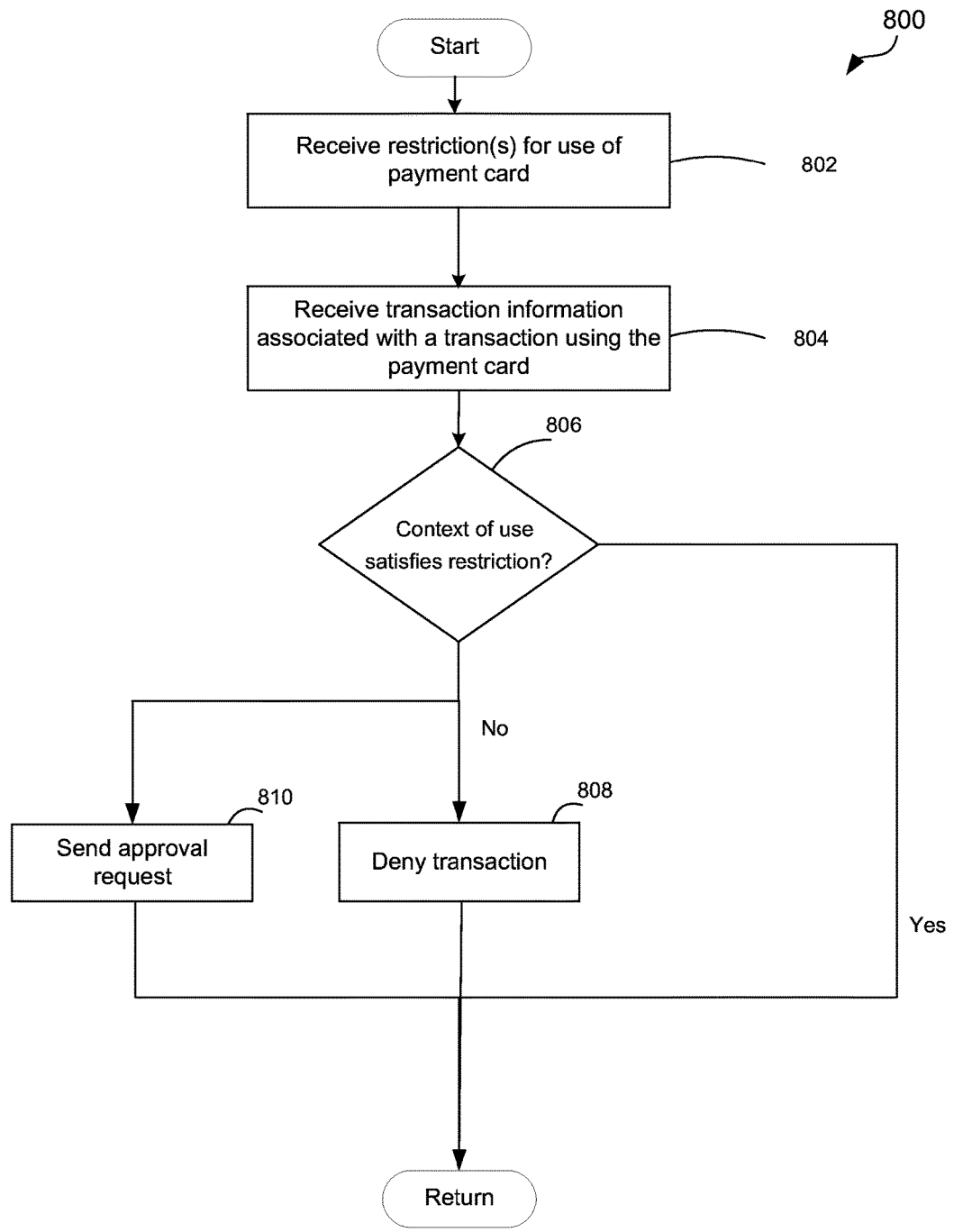
FIG. 8 is a flow diagram illustrating a process for implementing context-based usage restrictions on a payment card, in accordance with an embodiment.

FIG. 8 is a flow diagram illustrating a process 800 for applying context-based usage restrictions on a payment card, in accordance with an embodiment. The process can be performed by the payment service system 130 in the environment 100 of FIG. 1. The process begins at step 802 when a user, such as a cardholder, submits one or more inputs to place context-based restrictions on usage of a payment card. The inputs can be submitted, for example, via a mobile payment application associated with the payment service system 130, via a web portal associated with the payment service system 130, via a kiosk associated with the payment service system 130, etc. The inputs (i.e., the context-based restrictions) are then sent to the payment service system 130. The payment service system 130 can use the restrictions to facilitate usage of the payment card specified by the user.

At step 804, the payment service system 130 receives an indication of an initiation of a transaction in which the payment card is utilized. The indication can include transaction information associated with the transaction (e.g., card number, transaction location, date, time, amount, etc.). At step 806, the payment service system 130 analyzes the context in which the payment card is utilized based on the transaction information. The payment service system 130 determines whether the context satisfies the usage restriction placed on the payment card by the user. If the context does not satisfy the usage restriction, the payment service system 130 denies the transaction, as indicated in step 808. The payment service system 130 can also transmit an approval request to the user to deny or approve the transaction, as indicated in step 810. The process 800 ends if the payment service system 130 determines that the context satisfies the usage restriction.

FIG. 9 is a block diagram of an example computing system 900 that can be used to implement features of various embodiments of the disclosed technology described above. The computing system 900 can be the personal computing device(s) 104, the POS device 110, the financial system 120, or the payment service system 130. Any of these systems may include two or more processing devices such as represented in FIG. 9, which may be coupled to each other via a network or multiple networks.

In the illustrated embodiment, the computing system 900 includes one or more processors 910, memory 911, a communication device 912, one or more input/output (I/O) devices 913, and one or more storage devices 914, all coupled to each other through an interconnect 915. The interconnect 915 may be or include one or more conductive traces, buses, point-to-point connections, controllers, adapters and/or other conventional connection devices.

The processor(s) 910 may be or include, for example, one or more general-purpose programmable microprocessors, microcontrollers, application specific integrated circuits (ASICs), programmable gate arrays, or the like, or a combination of such devices.

The processor(s) 910 control the overall operation of the processing device 900. Memory 911 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 911 may store data and instructions that configure the processor(s) 910 to execute operations in accordance with the techniques described above.

The communication device 912 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 913 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner. The techniques of the technology introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques of the technology introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The invention claimed is:

1. A method, comprising:
configuring, by a payment service system via a wireless communications network, a mobile payment application to maintain a set of one or more payment cards of a user, the mobile payment application executing on a mobile device associated with the user;
receiving, by the payment service system and from the mobile device via the wireless communications network, a usage restriction to be applied to a payment card of the set of one or more payment cards maintained through the mobile payment application,
wherein the usage restriction restricts use of the payment card based on a context in which the payment card is used,
wherein the usage restriction is received as input from the user at the mobile payment application, and
wherein the payment card is an electronic card including an Europay MasterCard Visa (EMV) card or a Bluetooth Low Energy (BLE) metacard;
receiving, by the payment service system and from the mobile device, Global Positioning System (GPS) coordinates recorded by the mobile device;
receiving, by the payment service system, transaction information from a point-of-sale (POS) device associated with a merchant, the transaction information associated with a payment transaction occurring between the merchant and a customer, the payment transaction initiated by a swipe of the payment card through a card reader communicatively coupled to the POS device;
determining, by the payment service system, a usage context of the payment card in the payment transaction by extracting GPS coordinates from the transaction information;
determining, by the payment service system, whether the usage context of the payment card complies with the usage restriction by comparing the GPS coordinates recorded by the mobile device to the GPS coordinates extracted from the transaction information;
responsive to a determination that the mobile device is within a specified proximity of the POS device,
determining that the usage context of the payment card complies with the usage restriction; and
performing, by the payment service system, a processing of the payment transaction between the merchant and the customer; and
responsive to a determination that the mobile device is not within the specified proximity of the POS device,
determining that the usage context of the payment card does not comply with the usage restriction;
transmitting, by the payment service system and to the mobile device, a notification to the user that prompts the user to deny or approve the payment transaction; and
transmitting, by the payment service system and to the POS device, a notification to the merchant that specifies a likelihood of fraud exists.

2. The method of claim 1, further comprising:
responsive to receiving an approval of the payment transaction from the mobile device, performing, by the payment service system, the processing of the payment transaction between the merchant and the customer.

3. The method of claim 1, wherein the usage restriction comprises:
a geographical restriction that approves usage of the payment card based on a particular geographical location associated with the payment transaction.

* * * * *